United States Patent [19]

Wey et al.

[11] Patent Number: 5,994,474
[45] Date of Patent: Nov. 30, 1999

[54] USE OF SILANE-GRAFTED AMORPHOUS POLY-α-OLEFINS AS MOISTURE-CROSSLINKING ADHESIVE BASE MATERIAL OR ADHESIVE

[75] Inventors: Hans Guenther Wey, Muelheim; Peter Bickert, Duelmen, both of Germany

[73] Assignee: Heuls Aktiengesellschaft, Marl, Germany

[21] Appl. No.: 08/923,521

[22] Filed: Sep. 4, 1997

[30] Foreign Application Priority Data

Sep. 4, 1996 [DE] Germany .......................... 196 35 882
Jun. 12, 1997 [DE] Germany .......................... 197 24 835

[51] Int. Cl.[6] ........................................................ C08F 8/00
[52] U.S. Cl. ...................... 525/288; 525/326.5; 525/383
[58] Field of Search .................................. 525/288, 326.5, 525/383

[56] References Cited

U.S. PATENT DOCUMENTS 5,241,014  8/1993  Kehr et al. .............................. 525/376

FOREIGN PATENT DOCUMENTS

| 0 442 045 | 8/1991 | European Pat. Off. . |
| 196 24 236 A1 | 1/1988 | Germany . |
| 40 00 695 | 7/1991 | Germany . |
| 40 00 696 | 7/1991 | Germany . |
| 195 16 457 | 11/1995 | Germany . |

*Primary Examiner*—Bernard Lipman
*Attorney, Agent, or Firm*—Oblon, Spivak McClelland, Maier & Neustadt, P.C.

[57] ABSTRACT

An adhesive bond is produced using an adhesive composition which comprises a silane-grafted, largely amorphous poly-α-olefin prepared by grafting onto said largely amorphous poly-α-olefin a silane compound having from 1–3 alkoxy groups attached directly to the silicon and at least one olefinic double bond containing moiety, and then crosslinking the adhesive composition by means of water.

13 Claims, No Drawings

USE OF SILANE-GRAFTED AMORPHOUS POLY-α-OLEFINS AS MOISTURE-CROSSLINKING ADHESIVE BASE MATERIAL OR ADHESIVE

BACKGROUND OF THE INVENTION

1. Field of the Invention

The present invention relates to the use of certain silane-grafted amorphous poly-α-olefins as a moisture-crosslinking adhesive base material or as a constituent of a moisture-crosslinking adhesive system, especially for applications in the construction, woodworking and automotive industry, where the adhesive is used primarily as a hotmelt adhesive.

2. Description of the Background

Amorphous poly-α-olefins are used as adhesive base materials for a wide range of applications. The field of use extends from the hygiene sector through laminates and packaging adhesives to constructive bonding and uses in wood processing. In the majority of these applications, the adhesive base materials are notable for their strong adhesion to various substrates, strong cohesion and good resistance to chemicals coupled with an excellent price/performance ratio.

Many demanding applications, for example the bonding of glass, ceramic, metal and various polymer combinations, can be realized to a certain extent by amorphous poly-α-olefins by formulating the adhesive base material with a large number of components and additives such as tackier resins, waxes, other polymers, plasticizers and stabilizers. Nevertheless, it is not possible in every case to attain the required levels of adhesion and cohesion. Furthermore, the thermal stability of adhesive bonds implemented with amorphous poly-α-olefins or with formulations based on these substances is inadequate for certain applications, so that in many cases the user has to resort to more expensive, reactive bonding systems, such as polyurethane, epoxy or silicone adhesives.

DE 40 00 695 describes amorphous poly-α-olefins onto which are grafted reactive monomers and which are employed as hotmelt adhesives and for heavy-duty carpet coating compositions. Because of the low level of molecular non-uniformity dictated by their preparation, these grafted poly-α-olefins possess improved cohesion. For heavy-duty bonding, however, the cohesion thus obtained is still inadequate. Furthermore, no marked improvements are achieved with respect to thermal stability.

In order to improve the cohesion and the thermal stability of the adhesive film, it is also necessary for chemical bonds to be formed between the polymer chains of the adhesive film. Such a system is described in DE 195 16 457. The system described therein, however, consists of two different polymer components, one being a silane-grafted polyolefin such as ethylene-vinyl acetate (EVA) copolymer and the other being a maleic anhydride(MAA)grafted polyolefin (e.g. EVA) to which a crosslinking accelerator is added. The handling of this multicomponent system is labor-intensive because of the two components, which are absolutely essential, and the resulting logistical and mixing effort. Furthermore, the toxicological properties of MAA-grafted systems make them unsuitable for use in the food sector, which is a limitation which further restricts the scope for employing the system disclosed and claimed in the reference. A need continues to exist for adhesive compositions based on poly-α-olefins which not only exhibit good adhesive properties, but which also exhibit good thermal stability.

SUMMARY OF THE INVENTION

Accordingly, one object of the present invention is to provide a process for producing an adhesive bond by means of an adhesive formulation, based on a silane-grafted, largely amorphous poly-α-olefin, which exhibits high adhesion, high cohesion and high thermal stability.

Briefly, this object and other objects of the present invention as hereinafter will become more readily apparent can be attained by an adhesive composition, comprising a silane-grafted, largely amorphous poly-α-olefin prepared by a process for producing an adhesive bond by means of grafting a silane compound having at least three alkoxy groups attached directly to the silicon and at least one olefinic double bond containing moiety onto said largely amorphous poly-α-olefin, the adhesive composition being crosslinked by water.

DETAILED DESCRIPTION OF THE PREFERRED EMBODIMENTS

The largely amorphous poly-α-olefin starting material can be a homopolymer or a copolymer, for example atactic polypropylene (APP), atactic poly-1-butene or, preferably, a copolymer or a terpolymer having the following monomer composition:

from 0–95% by weight of an α-olefin having 4–10 carbon atoms, preferably from 3–95% by weight, from 5–100% by weight of propane, preferably from 5–97% by weight, and from 0–20% by weight of ethane.

The largely amorphous poly-α-olefin is either completely amorphous or has only a low level of crystallinity. In general, the degree of crystallinity should not exceed 25% as determined by X-ray diffraction.

The silane to be grafted on the amorphous poly-α-olefin preferably has three alkoxy groups attached directly to the silicon. Suitable examples are vinyltrimethoxysilane (VTMO), vinyltriethoxysilane, vinyl tris(2-methoxyethoxy) silane, 3-methacryloxypropyltrimethoxysilane (MEMO; $H_2C=C(CH_3)COO(CH_2)_3—Si(OCH_3)_3$), 3-methacryloxypropyltriethoxysilane, vinyldimethyl-methoxysilane and vinylmethyldibutoxysilane. The silane is usually employed for grafting in amounts of from 0.1–10% by weight, preferably from 0.5–5% by weight, based on the poly-α-olefin.

The unsaturated silane can be grafted onto the largely amorphous poly-α-olefin by any known method, for example in solution or, preferably, in the melt, using an appropriate amount of a free-radical donor. One suitable technique can be found in DE 40 00 695, which is expressly incorporated by reference. Suitable examples of free-radical donors include diacyl peroxides such as dilauryl peroxide and didecanoyl peroxide, alkyl peresters such as tert-butyl peroxy-2-ethylhexanoate, perketals such as 1,1-di(tert-butylperoxy)-3,3, 5-trimethylcyclohexane or 1,1-di(tert-butylperoxy)cyclohexane, dialkyl peroxides such as tert-butyl cumyl peroxide, di(tert-butyl) peroxide and dicumyl peroxide, C-radical donors, for example 3,4-dimethyl-3,4-diphenylhexane and 2,3-dimethyl-2,3-diphenylbutane, and azo compounds, such as 2,2'-azodi(2-acetoxypropane).

In order to increase the rate of crosslinking it is possible to add a crosslinking accelerator, usually an organotin compound such as dibutyltin dilaurate, for example, to the silane-grafted, largely amorphous poly-α-olefin. This addition can be made either in pure form or, for greater ease of metering, in the form of a master batch comprising any desired poly-α-olefin. The addition of the accelerator can be made before melting, in the form of a dry mix, or after melting. In this context, contents of from 0.001–20% by weight, preferably from 0.01–5% by weight, have been found suitable.

Alternatively, by adding non-grafted, readily hydrolyzable silanes such as hexadecyltrimethoxysilane or hexadecyltriethoxysilane, it is possible to reduce the rate of crosslinking and/or to increase stability on storage. At least some of the water which diffuses into the adhesive film is intercepted by these silanes, so that a longer time is required for the water necessary to crosslink the silane-grafted poly-α-olefin to be available in the adhesive film. For this purpose it is advisable to use silanes with long-chain alkyl radicals, since they do not evaporate when the products are melted and thus are not lost as an active substance and, furthermore, do not give rise to any disposal or workplace hygiene problems.

Whether the use of crosslinking accelerators or crosslinking retardants is necessary for a given application is something which the skilled worker can readily determine himself or herself on the basis of a few guideline experiments.

In order to establish the properties which are necessary for the adhesives user, such as bond strength, initial tack, viscosity, hardness, elasticity, thermal stability and stability to oxidation, etc., it is possible to add to the silane-grafted poly-α-olefin further substances which are conventionally used to establish the desired adhesives properties, such as tackier resins (from about 0.1–50% by weight), waxes (from about 0.1–50% by weight), other polymers (from about 0.1–80% by weight), plasticizers (from about 0.1–20% by weight) and, furthermore, the customary polymer additives, such as thermal stabilizers and light stabilizers, optical brighteners, antistats, lubricants and antiblocking agents, nucleating agents, fillers and dyes, pigments and flame retardants. It should, of course, be borne in mind that water present in the additives may increase the rate of crosslinking of the adhesive.

In addition to the customary additives, the adhesive should include at least 5% by weight, preferably at least 10% by weight, of silane-grafted poly-α-olefin. However, the silane-grafted poly-α-olefin can, of course, be used alone without any additives.

Suitable examples of tackier resins include synthetic terpene resin, modified terpene resins, aliphatic hydrocarbon resins, completely or partially hydrogenated rosin glycerol ester resins, liquid resins, hydrogenated cyclic hydrocarbon resins, aliphatic-aromatic hydrocarbon resins, hydrogenated pentaerythritol esters of colophony resin, or aromatically modified hydrocarbon resins. As waxes, all customary types can in principle be used. Suitable examples include microcrystalline waxes, synthetic waxes of the Fischer-Tropsch or polyolefin type, and fully refined waxes and amide waxes. Suitable other polymers include primarily rubbers, especially butyl rubber or SEBS (partially hydrogenated styrene-butadiene-styrene block copolymers) or polyolefins, the polyolefin used being primarily isotactic polypropylene and/or an amorphous poly-α-olefin. Suitable plasticizers include paraffinic or naphthenic oils, and low molecular weight poly-1-butene or polyisobutene.

The silane-grafted amorphous poly-α-olefin is applied as a pure substance or in the form of the above-indicated formulations to the substrates which are to be bonded, in the form of a melt at temperatures between 50° C. and 300° C., preferably between 100° C. and 200° C. and, with particular preference, between 130° C. and 180° C. This can be done using a wide variety of application techniques such as application by roller, slot die, knife coating, dotwise application, multiline application, rototherm application, spray application by the swirling technique or over a broad area with melt blow or air-assisted spray techniques. The substrates are subsequently joined within the so-called open time, whose duration depends on the composition of the applied mixture. If the applied adhesive is held at the application temperature by means of preheated substrates, rollers, etc. or radiation, then a longer time is of course available for the joining of the substrates.

The system is crosslinked by water, depending on the requirement of the user and the properties of the substrates. This is done by means of water vapor from the ambient air, by treatment with steam or hot water, or by means of water present within the substrates.

Using the adhesive of the invention it is possible to bond a variety of materials in all possible combinations and in all processed forms, for example as films, sheets, fabrics, etc. The following materials may be mentioned by way of example: polyolefins (especially polyethylene, polypropylene, poly-1-butene), polystyrene, polyvinyl chloride, polycondensates (especially polyesters, polyamides, polyurethanes), rubbers (for example, EPM, EPDM, NBR, SBS, SBR, BR, natural rubber, butyl rubber, chloroprene rubber, silicone rubber), wood, cellulose materials, papers and cardboard packaging of all kinds, fiberboards, metals (including iron, steel, stainless steel, aluminum, brass and copper), glass, ceramic and concrete.

In this context, an extremely strong adhesion is obtained, especially with regard to substrates whose surface carries OH groups. In addition and unexpectedly, there is also an increase in the adhesion to plastics, which are normally difficult to bond using amorphous poly-α-olefins.

As is typical of hotmelt adhesives, these adhesives exhibit, just a few minutes after application, an initial tack which in many cases makes it possible to do away with assembly aids.

Having generally described this invention, a further understanding can be obtained by reference to certain specific examples which are provided herein for purposes of illustration only and are not intended to be limiting unless otherwise specified.

EXAMPLE 1

A largely amorphous poly-α-olefin (APAO) having the following monomer constituency is used:

6% by weight of ethane

64% by weight of propane

30% by weight of 1-butene.

In a twin-screw extruder (Berstorff ZE 40) a mixture consisting of:

92.9% by weight of the APAO above, 6.0% by weight of vinyltrimethoxysilane, (DYNASILAN⁻VTMO), and 1.1% by weight of dicumyl peroxide.

is mixed at a temperature of 155–160° C. in the absence of air and moisture and is held at this temperature for a dwell time of around 90 sec. In the final zone of the extruder, the excess VTMO is vaporized under a vacuum of about 20 mbar and is condensed in cold traps. The product is stabilized by adding IRGANOX 1076.

The properties of the starting material and of the product are listed in the table below.

| Property | Measurement method | Units | APAO | Reaction product |
|---|---|---|---|---|
| Melt viscosity at 190° C. | in accordance with DIN 53019 (shear rate 30.5 [1/s]) | mPa · s | about 50,000 | about 6000 |
| Softening point (ring and ball) | in accordance with DIN 52011 | ° C. | 107 | 98 |
| Needle penetration (100/25/5) | in accordance with DIN 52010 | 0.1 mm | 14 | 15 |
| Molar weight $M_n$ | GPC in accordance with DIN 55672 | g/mol | 18,100 | 10,600 |
| $M_w$ | | | 92,000 | 38,000 |
| U | | | 4.1 | 2.6 |

EXAMPLE 2

The silane-grafted amorphous poly-α-olefin from Example 1 is melted in a drying oven at 170° C. under an $N_2$ atmosphere for 1 h and the melt is then applied at a temperature of 170° C. to a wooden test piece. This piece is joined within a period of 0.5 min. to a further wooden test piece with a single overlap over an area of 4 cm² and the test pieces are pressed against one another for 5 minutes with a weight of 2 kg. The bond sample is then stored at 23° C. and 60% relative atmospheric humidity for 14 days before being subjected to a tensile test and a test of the thermal stability. The results of these measurements are shown in Table 1.

EXAMPLE 3

The silane-grafted amorphous poly-α-olefin from Example 1 is melted in a drying oven at 170° C. under an $N_2$ atmosphere for 1 h. Then 5% by weight of an accelerator in the form of a master batch comprising 98% by weight of an amorphous poly-α-olefin (VESTOPLAST® 708) and 2% by weight of dibutyltin dilaurate is added. After the melt has been homogenized, the mixture is applied at a temperature of 170° C. to a wooden test piece. This test piece is joined in the manner described in Example 2 to a further wooden test piece, and the joined pieces are stored and tested. The results of the measurements are shown in Table 1.

EXAMPLE 4 (not in accordance with the invention)

Two wooden test pieces are joined in the manner described in Example 2 using the unfunctionalized amorphous poly-α-olefin VESTOPLAST® 708, and the joined pieces are stored and tested. The results of these measurements are shown in Table 1. The amorphous poly-α-olefin employed is very closely comparable, in terms of the monomer composition of the hydrocarbon chain and the melt viscosity, to the silane-grafted amorphous poly-α-olefin used.

EXAMPLE 5

The silane-grafted amorphous poly-α-olefin from Example 1 is melted in the manner described in Example 2 and is applied at a temperature of 150° C. to a glass test piece which has been degreased using acetone. This coating is joined within a period of 0.5 minutes to a further glass plate, which has also been degreased, with a single overlap over an area of 4 cm² and the pieces of glass are pressed against one another for 5 minutes with a weight of 2 kg. The bonded sample is then stored at 23° C. and 60% relative atmospheric humidity for 20 days before being subjected to a tensile test and a test of the thermal stability. The results of these measurements are shown in Table 1.

EXAMPLE 6

The silane-grafted amorphous poly-α-olefin from Example 1 and the master batch described in Example 3 are mixed in the manner described in Example 3 and the mixture is applied at a temperature of 150° C. to an acetone-degreased glass test piece. This test piece is joined in the manner described in Example 5 to a further glass test piece, and the joined pieces are stored and tested. The results of the measurements are shown in Table 1.

EXAMPLE 7 (not in accordance with the invention)

Two degreased glass test pieces are joined in the manner described in Example 5 using the unfunctionalized amorphous poly-α-olefin VESTOPLAST® 708, and the joined pieces are stored and tested. The results of these measurements are shown in Table 1.

EXAMPLE 8

The silane-grafted amorphous poly-α-olefin from Example 1 is melted in the manner described in Example 2 and is applied at a temperature of 150° C. to a polyethylene test piece. This coating is joined within a period of 30 sec to a polyamide 6,6 test piece with a single overlap over an area of 4 cm² and the two test pieces are pressed together for 110 minutes with a weight of 2 kg. The bonded sample is then stored at 23° C. and 60% relative atmospheric humidity for 24 h before being subjected to a tensile test and a test of the thermal stability. The results of these measurements are shown in Table 1.

EXAMPLE 9

The silane-grafted amorphous poly-α-olefin from Example 1 and the master batch described in Example 3 are mixed in the manner described in Example 3 and the mixture is applied at a temperature of 150° C. to a polyethylene test piece. This test piece is joined in the manner described in Example 8 to a polyamide 6,6 test piece, and the joined pieces are stored and tested. The results of the measurements are shown in Table 1.

EXAMPLE 10 (not in accordance with the invention)

A polyethylene test piece is coated in the manner described in Example 8 with the unfunctionalized amorphous poly-α-olefin VESTOPLAST® 708, joined to a polyamide 6,6 test piece, and the joined test pieces are stored and tested. The results of these measurements are shown in Table 1.

EXAMPLE 11

The silane-grafted amorphous poly-α-olefin from Example 1 is melted in the manner described in Example 2 and is applied at a temperature of 150° C. to an acetone-degreased ceramic test piece. This coating is joined within a period of 0.5 minutes to a further ceramic plate, which has also been degreased, with a single overlap over an area of 4 cm² and the joined ceramic pieces are pressed against one another for 5 minutes with a weight of 2 kg. The bonded sample is then stored at 23° C. at 60% relative atmospheric humidity for 20 days before being subjected to a tensile test and a test of the thermal stability. The results of these measurements are shown in Table 1.

EXAMPLE 12

The silane-grafted amorphous poly-α-olefin from Example 1 and the master batch described in Example 3 are mixed in the manner described in Example 3 and the mixture is applied at a temperature of 150° C. to an acetone-degreased ceramic test piece. This test piece is joined in the manner described in Example 5 to a further ceramic test piece, and the joined test pieces are stored and tested. The results of the measurements are shown in Table 1.

EXAMPLE 13 (not in accordance with the invention)

Two degreased ceramic test pieces are joined in the manner described in Example 5 using the unfunctionalized amorphous poly-α-olefin VESTOPLAST® 708, and the joined pieces are stored and tested. The results of these measurements are shown in Table 1.

EXAMPLE 14

The silane-grafted amorphous poly-α-olefin from Example 1 is melted in the manner described in Example 2 and is applied at a temperature of 150° C. to an acetone-degreased aluminum test piece. This coating is joined within a period of 30 sec to a further aluminum plate, which has also been degreased, with a single overlap over an area of 4 cm$^2$ and the joined aluminum pieces are pressed against one another for 10 minutes with a weight of 2kg. The bonded sample is then stored at 23° C. at 60% relative atmospheric humidity for 14 days before being subjected to a tensile test and a test of the thermal stability. The results of these measurements are shown in Table 1.

EXAMPLE 15

The silane-grafted amorphous poly-α-olefin from Example 1 and the master batch described in Example 3 are mixed in the manner described in Example 3 and the mixture is applied at a temperature of 150° C. to an acetone-degreased aluminum test piece. This test piece is joined in the manner described in Example 5 to a further aluminum test piece, and the joined test pieces are stored and tested. The results of the measurements are shown in Table 1.

EXAMPLE 16 (not in accordance with the invention)

Two degreased aluminum test pieces are joined in the manner described in Example 5 using the unfunctionalized amorphous poly-α-olefin VESTOPLAST® 708, and the joined pieces are stored and tested. The results of these measurements are shown in Table 1.

TABLE 1

MEASUREMENT RESULTS FOR EXAMPLES 2–16

| Example | Thermal stability according to WPS 68[° C.] | Tensile shear strength according to DIN 53283 [N/m-m$^2$] |
|---|---|---|
| 2 | 165 | 2.3 |
| 3 | 185 | 3.5 |
| 4 a) | 75 | 0.7 |
| 5 | b) | 2.9 |
| 6 | b) | 3.4 |
| 7 a) | b) | <0.1 |
| 8 | b) | 1.6 |
| 9 | b) | 1.3 |
| 10 a) | b) | 1 |
| 11 | b) | 3.1 |
| 12 | b) | 3.7 |
| 13 a) | b) | <0.1 |
| 14 | b) | 0.8 |

TABLE 1-continued

MEASUREMENT RESULTS FOR EXAMPLES 2–16

| Example | Thermal stability according to WPS 68[° C.] | Tensile shear strength according to DIN 53283 [N/m-m$^2$] |
|---|---|---|
| 15 | b) | 0.6 |
| 16 a) | b) | 0.4 | a) not in accordance with the invention
b) not measured

EXAMPLE 17

The silane-grafted amorphous poly-α-olefin from Example 1 is melted in the manner described in Example 2 and the melt is applied at a temperature of 130° C. using a 20 μm doctor blade to a polyethylene film. The coating weight in this case is about 11 g/m$^2$. A PA non-woven is applied to this coating and pressed thereon under a pressure of 500 hPa with a roller preheated to 80° C. The bonded sample is then stored at 23° C. and 60% relative atmospheric humidity for 24 h and then the tensile shear strength is measured in accordance with DIN 53283. The result of this measurement is shown in Table 2.

EXAMPLE 18

Corresponding exactly to Example 3, a mixture of silane-grafted poly-α-olefin and master batch is prepared. This mixture is applied at a temperature of 130° C. using a 20 um doctor blade to a polyethylene film, the coating weight being about 11 g/m$^2$. A PA non-woven is added to this coating in the manner described in Example 17, and the assembly is stored and tested. The result of these measurements is shown in Table 2.

EXAMPLE 19 (not in accordance with the invention)

A polyethylene film is coated in the manner described in Example 17 with the unfunctionalized amorphous poly-α-olefin VESTOPLAST⁻ 708. A PA non-woven is added to this coating in the manner likewise described in Example 17, and the assembly is stored and tested. The result of these measurements is shown in Table 2.

TABLE 2

MEASUREMENT RESULTS FOR EXAMPLE 17–19

| Tensile shear strength according to DIN 53283 [N/mm$^2$] | Example 17 | Example 18 | Example 19*) |
|---|---|---|---|
| a) immediately after production | 4.0 | 3.0 | 1.0 |
| b) after 6 days of storage | 6.0 | 4.0 | 1.5 |

*$^8$)not in accordance with the invention.

EXAMPLE 20

After melting with silane-grafted amorphous poly-α-olefin from Example 1 in a drying oven at 140° C. under a N$_2$ atmosphere, a mixture of the following constituents is prepared at a temperature of 140° C.:

59 parts by weight of the product from Example 1

6 parts by weight of IPP (isotactic polypropylene; MFR about 70; VESTOLEN® P2000)

1 part by weight of HOSTAMONT TP AR 504 (maleic anhydride-modified polypropylene)

8.5 parts by weight of ESCOREZ 5320 (hydrogenated cyclic hydrocarbon resin)

8.5 parts by weight of FORAL 105 (completely hydrogenated rosin ester)

1 part by weight of VISCOL® 550 P (polypropylene wax)

17 parts by weight of Sachtleben Schwerspatmehl [heavy spar flour] CH 1177

0.2 part by weight of IRGANOX 1076 (stabilizer)

0.1 part by weight of DHT-4A (co-stabilizer)

0.05 part by weight of NAUGARD 445 (stabilizer)

The mixture has the following properties:

Softening point (ring and ball): 160° C.

Melt viscosity at 190° C.: 12,000 mPa s

Needle penetration (100/25/5): 8 [0.1 mm]

The mixture is tested for its suitability for use as an adhesive in the woodworking industry for edge bonding (ABS to wood). The results of these measurements are shown in Table 4.

EXAMPLE 21 (not in accordance with the inventions

The mixture is prepared in the manner and with the composition described in Example 20, except that in this comparison example the unfunctionalized amorphous poly-α-olefin VESTOPLAST® 792 is used instead of the silane-grafted amorphous poly-α-olefin This VESTOPLAST grade is selected because, compared with the other available VESTOPLAST grades, it gives the formulation having the best properties.

The mixture has the following properties:

Softening point (RuK): 160° C.

Melt viscosity at 190° C.: 120,000 mPa s

Needle penetration (100/25/5): 10 [0.1 mm]

The mixture is likewise tested for its suitability for use as an adhesive in the woodworking industry for edge bonding. The results of these measurements are shown in Table 4.

EXAMPLE 22

In accordance with Example 3, a mixture of 100 parts by weight of the composition from Example 20 and 3.4 parts by weight of the masterbatch is prepared.

The mixture has the following properties:

Softening point (ring and ball): 160° C.

Melt viscosity at 190° C.: 9000 mPa s

Needle penetration (100/2515): 9 [0.1 mm]

This mixture, too, was tested for its suitability for use as an adhesive in the woodworking industry for edge bonding. The results of these measurements are shown in Table 4.

TABLE 4

MEASUREMENT RESULTS FOR EXAMPLES 20–22

|  | Example 20 | Example 21*) | Example 22 |
|---|---|---|---|
| Thermal stability according to WPS 68 | >165° C. (fiber tear-out from the wood) | 110–115° C. | >165° C. (fiber tear-out from the wood) |
| Open time | 20 s | 70 s | 21 s |
| Setting time | 1 s | 1 s | 1 s |
| Peel resistance in accordance with DIN 53 273 [N/mm] | 14.6 | 10.0 | 15.4 |

*)not in accordance with the invention.

EXAMPLE 23

FORMULATION FOR BONDING VARIOUS POLYMER LAYERS 15 parts of amorphous poly-α-olefin having a viscosity of 50,000 mPa s (e.g. VESTOPLAST 750)

35 parts of silane-grafted amorphous poly-α-olefin from Example 1

30 parts of hydrogenated cyclic hydrocarbon resin (e.g. ESCOREZ 5300)

20 parts of plasticizer (e.g. NAPVIS D 10)

0.3 part of stabilizer (e.g. IRGANOX 1076)

0.1 part of co-stabilizer (e.g. DHT-4A)

0.05 part of stabilizer (e.g. LOWINOX TBM-6)

EXAMPLE 24

FORMULATION FOR A SPRAYABLE HOT MELT ADHESIVE 70 parts of silane-grafted amorphous poly-α-olefin from Example 1

25 parts of hydrocarbon resin (e.g. ESCOREZ 5380)

5 parts of plasticizer (e.g. NAPVIS D 10)

0.4 part of stabilizer (e.g. IRGANOX 1076)

EXAMPLE 25

FORMULATION FOR A GLASS INSULATING LAMINATE SEALING COMPOSITION WITH GOOD ADHESION AND BONDING TO METAL AND GLASS 38 parts of silane-grafted amorphous poly-α-olefin from Example 1

15 parts of amorphous poly-α-olefin having a viscosity of 50,000 mPa s (e.g. VESTOPLAST 750)

1.5 parts of rubber (e.g. KRATON G 1657)

30 parts of plasticizer (e.g. OPPANOL B 15)

7.5 parts of butyl rubber (e.g. PB 402-24)

7.5 parts of plasticizer (e.g. BEVILITE 62-107)

0.4 part of carbon black (e.g. PRINTEX 60)

0.3 part of stabilizer (e.g. IRGANOX 1076)

0.1 part of co-stabilizer (e.g. DHT-4A)

0.1 part of stabilizer (e.g. NAUGARD 445)

EXAMPLE 26

FORMULATION FOR AN EDGE BONDING COMPOSITION FEATURING LOW APPLICATION VISCOSITY, EXCELLENT ADHESION AND THERMAL STABILITY 59 parts of silane-grafted amorphous poly-α-olefin from Example 1

5 parts of isotactic PP having an MFR of about 70 (e.g. VESTOLEN P 2000)

1 part of maleic anhydride-modified PP (e.g. HOSTAMONT TP AR 504)

8.5 parts of hydrogenated cyclic hydrocarbon resin (e.g. ESCOREZ 5320)

8.5 parts of completely hydrogenated rosin glycerol ester (e.g. FORAL 105)

1 part of polypropylene wax (e.g. VISCOL 550 P)

17 parts of heavy spar (e.g. Schwerspat SACHTLEBEN 1177)

0.2 part of stabilizer (e.g. IRGANOX 1076)

0.1 part of costabilizer (e.g.DHT-4A)

0.05 part of stabilizer (e.g. NAUGARD 445)

The disclosures of German priority applications 196 35 882.5 filed Sep. 4, 1996 and 197 24 835.7 filed Jun. 12, 1997 are hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is desired to be secured by Letters Patent of the United States is:

1. A process for producing an adhesive bond between objects, comprising:

applying to the objects an adhesive composition comprising a silane-grafted, largely amorphous poly-α-olefin, wherein the silane to be grafted on the amorphous poly-α-olefin has at least one olefinic double bond containing moiety and from 1–3 alkoxy groups attached directly to the silicon, and permitting moisture, as it is absorbed by the applied adhesive composition, to cause crosslinking within the adhesive composition.

2. The adhesive process as claimed in claim 1, wherein an amount of from 0.1–10% by weight, based on the poly-α-olefin, of said silane compound is grafted on said poly-α-olefin.

3. The process as claimed in claim 1, wherein said silane compound is vinyltrimethoxysilane, vinyltriethoxysilane, vinyl-tris(2-methoxyethoxy)silane, 3-methacryloxypropyltrimethoxysilane, 3-methacryloxypropyltriethoxysilane, vinyldimethylmethoxysilane or vinylmethyldibutoxysilane.

4. The process as claimed in claim 1, wherein the largely amorphous poly-α-olefin is an atactic polypropylene, an atactic poly-1-butene or a copolymer or terpolymer having the following monomer composition:

from 0–95% by weight of an α-olefin having 4–10 carbon atoms, from 5–100% by weight of propane and from 0–20% by weight of ethane.

5. The process as claimed in claim 4, wherein the largely amorphous poly-α-olefin has the following monomer composition:

from 3–95% by weight of an a-olefin having 4–10 carbon atoms, from 5–97% by weight of propane and from 0–20% by weight of ethane.

6. The process as claimed in claim 1, wherein the adhesive composition further comprises additives selected from the group consisting of tackifier resins, waxes, other polymers, plasticizers, stabilizers, optical brighteners, antistats, lubricants and antiblocking agents, nucleating agents, fillers, dyes, pigments, flame retardants, and combinations thereof.

7. The process as claimed in claim 1, wherein said composition comprises:

a) from 0.1–50% by weight of tackifier resins and/or b) from 0.1–50% by weight of waxes and/or c) from 0.1–80% by weight of other polymers and/or d) from 0.1–20% by weight of plasticizers.

8. The process as claimed in claim 1, wherein said, adhesive composition comprises at least 10% by weight of said silane-grafted poly-α-olefin.

9. The process as claimed in claim 1, wherein the adhesive composition is a hot-melt adhesive.

10. A method of bonding two or more surfaces, comprising:

a) applying an adhesive composition comprising a silane-grafted, largely amorphous poly-α-olefin, wherein the silane to be grafted on the amorphous poly-α-olefin has at least one olefinic double bond containing moiety and from 1–3 alkoxy groups attached directly to the silicon to said surfaces and joining the surfaces together, and b) crosslinking the adhesive composition by means of water.

11. The method as claimed in claim 10, wherein said surfaces are bonded together at a temperature of 50° C. and 300° C.

12. The method as claimed in claim 10, wherein the adhesive composition is applied to said surfaces by a roller, slot die, knife coating, dotwise, multiline, rototherm or spray application.

13. The method as claimed in claim 10, wherein the materials of said surfaces are polyolefins, polystyrene, polyvinylchloride, polycondensates, rubbers, wood, cellulose materials and cardboard packaging, fiberboards, metals, glass, ceramic and concrete.

* * * * *